United States Patent [19]

Kohl et al.

[11] Patent Number: 4,860,334
[45] Date of Patent: Aug. 22, 1989

[54] SYSTEM FOR DETECTING AND LOCATING DEFECTIVE CROSSPOINT SWITCHES

[75] Inventors: James E. Kohl, Schenectady; Donald L. Watrous, Clifton Park, both of N.Y.

[73] Assignee: Pacific Bell, San Francisco, Calif.

[21] Appl. No.: 248,405

[22] Filed: Sep. 23, 1988

[51] Int. Cl.⁴ ............................................. H04M 3/26
[52] U.S. Cl. ....................................................... 379/16
[58] Field of Search ........................... 379/9, 16, 10, 15

[56] References Cited
U.S. PATENT DOCUMENTS
4,401,861 8/1983 Braun et al. ........................... 379/16

Primary Examiner—Stafford D. Schreyer
Attorney, Agent, or Firm—McCubbrey, Bartels, Meyer & Ward

[57] ABSTRACT

A method and apparatus for detecting and locating defective crosspoint switches in a path consisting of a plurality of conducting segments connected by switch points is disclosed. The method and apparatus utilize the change in capacitance of the path which occurs when the switches are operated in a predetermined order.

12 Claims, 7 Drawing Sheets

SYSTEM FOR DETECTING AND LOCATING DEFECTIVE CROSSPOINT SWITCHES

FIELD OF THE INVENTION

The present invention relates generally to the field of the detection and location of defective switches in switching systems and more particularly to an accurate means, which is adaptable for automatic control, for remotely detecting and locating defective switches which are close to properly operating switches.

BACKGROUND OF THE INVENTION

In a typical telephone system, a subscriber's telephone is connected to a central office switching system by a subscriber loop consisting of two metallic conductors (referred to as "tip" and "ring" respectively). The subscriber loops are organized into cables which are routed to the premises of subscribers and potential subscribers. The subscriber loops terminate on a main distribution frame that services the particular region.

The subscriber loops are connected to terminals on one side of the main distribution frame, and the input lines to the central office switching system are connected to terminals on the other side. The main distribution frame makes the assignments between input lines to the central office switching system and the subscriber loops. In order to connect a new telephone subscriber onto the telephone company's central office switching system, a connection must be made from an input line of the central office switch to the desired subscriber loop. This connection will be referred to as a "call path." Presently, most of the call path connections are made manually. It would be more efficient and less costly to make the connections automatically from a remote location. Some main distribution frames can do this by utilizing switch matrices. A typical switch matrix contains hundreds of relay modules which are themselves smaller switch matrices. Each relay module contains many independently operable crosspoint switches. Each crosspoint has a double-pole, single-throw switch which connects both the tip and ring conductors.

The crosspoint switches in the switch matrix allow pairs of signal lines to be connected. The operations of the switch matrix must be organized so that when the crosspoint switches make the connections to form the call path, other lines in the switch matrix are not affected. Each line into the switch matrix must be capable of being connected to any of the lines out of the switch matrix (provided the line in question is not already connected to another input line). In general, a switch matrix is capable of connecting any of N input lines to any of M output lines without disturbing existing connections. A relay module with n input lines and m output lines has nxm crosspoints.

A call path from an input line to a subscriber loop may take many different paths through the switch matrix. Each call path involves a number of relay modules and crosspoint switches within the relay modules. If a crosspoint connection fails, by the crosspoint switch not closing or opening when desired, the call path will not be operable. A crosspoint switch may fail by being stuck open, stuck closed, or having the tip or ring contact alone being stuck open or closed. A typical failure is such that one contact is defective and the other operational; this is called a "half-crosspoint."

A problem in utilizing switch matrices in telecommunications applications is to find a defective crosspoint switch without disturbing other existing connections. The bad switch must be identified among many good switches and, because of the many possible paths through the switch matrix which a call path may take, the defective crosspoint switch must also be locatable independent of the length of the call path.

The detection, identification, and location of defective crosspoint switches should be done without significantly increasing the complexity of an already complex system. That is, the addition of more wires, instruments, and components for defect detection would complicate the existing system and add greatly to costs.

Further, efficient telephone operation requires that accurate detection and identification of the defective crosspoint be made from a remote location and be capable of automation, for instance, by computer control.

Since the crosspoint switches in the call paths may be rather close together in the sense that the impedance of the electrical conductors connecting these switches is small compared to the impedance of the total path through the cross-connect switch, the crosspoint detection and identification system must be capable of resolution sufficient to distinguish a defective crosspoint switch that is very close to a good crosspoint switch.

If a connection is made from the switch matrix to transmission long lines from outlying regions, there are effects from the long lines which may complicate the interpretation of signals indicating a defective crosspoint switch. An effective detection and identification system must address this problem.

The detection of faults in transmission cables has been done in the telecommunications industry by timing reflections of transmitted pulses by the fault back to the pulse source. This approach is most suitable for relatively uniform conductors which are hundreds to thousands of feet long. The timed reflection method is not suitable for switch matrix defect detection and identification because the reflections may occur because of any change in impedance along the conductor path, for instance, connectors, terminal blocks, and so on, which are not defects. Further, the accuracy and resolution of this method are not adequate for the relatively short paths found in switch matrices.

Broadly, it is an object of the present invention to increase telephone service efficiency by providing a method for detecting, identifying, and locating defective crosspoint switches in switch matrices.

It is a further object of the present invention to provide detector, implementing circuit, and procedure means for detecting, identifying, and locating defective crosspoint switches in switch matrices.

It is yet a further object of the present invention to provide a method and means for detecting, identifying, and locating defective crosspoint switches in a switch matrix without the need to modify existing switch matrices.

It is still a further object of the present invention to provide a crosspoint defect detection method and means which is adaptable to remote and automatic control.

It is another object of the present invention to provide a crosspoint defect detection method and means which is capable of defect resolution such that defective crosspoints which are relatively close to operable crosspoints are detectable and identifiable.

It is yet another object of the present invention to provide a crosspoint defect detection method and means which is capable of detecting, identifying, and locating defective crosspoints when a connection is made to a long-line conductor.

These and other objects of the present invention will become apparent to those skilled in the art from the following detailed description of the invention and the accompanying drawings.

SUMMARY OF THE INVENTION

The present invention comprises a method and apparatus for detecting and locating defective switches in a call path in a switch matrix. The method comprises measuring a change in capacitance between a point on one of the two conductors making up the call path and a second point which is either located on the other conductor or is held at a reference potential when the crosspoint switches connecting the call path are sequentially operated in a predetermined order.

The apparatus of the present invention comprises a circuit for measuring the change in capacitance between the two conductors making up the call path, or between one of these conductors and ground, when the crosspoint switches connecting the call path are operated in a predetermined order.

DETAILED DESCRIPTION OF THE INVENTION

Figure 1:
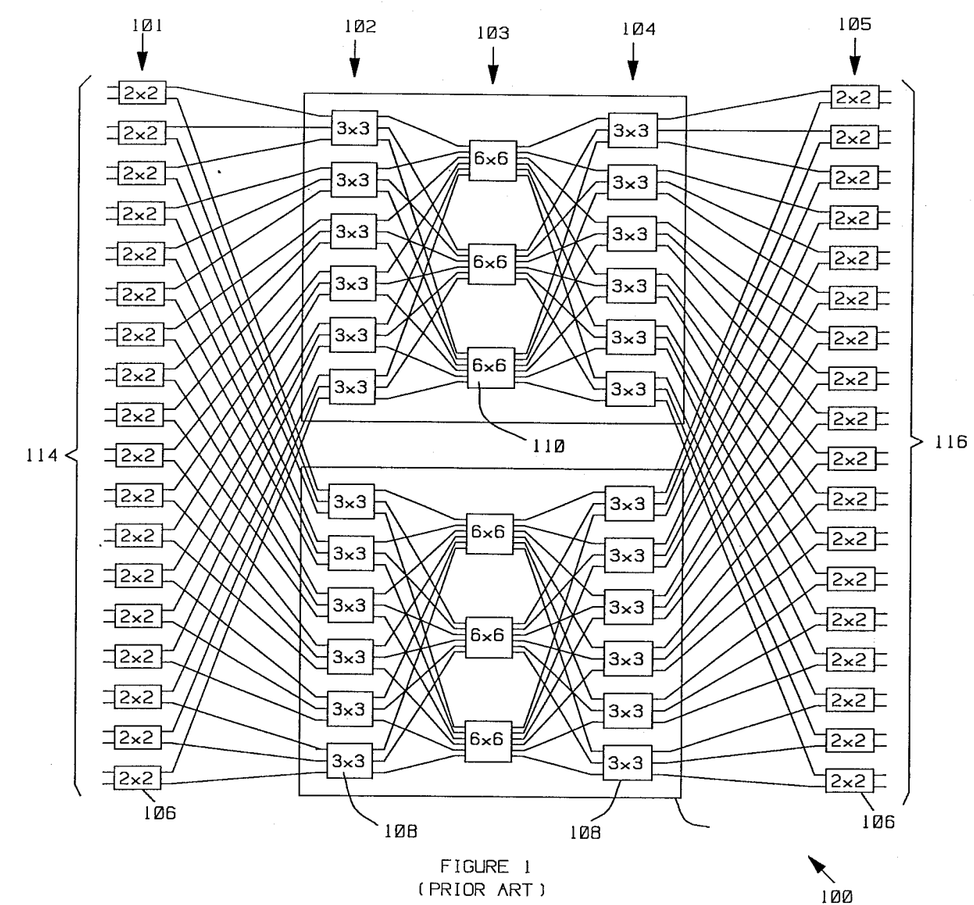
FIG. 1 is a block diagram of a typical prior art 36×36 switch matrix used in telecommunications.
Figure 2:
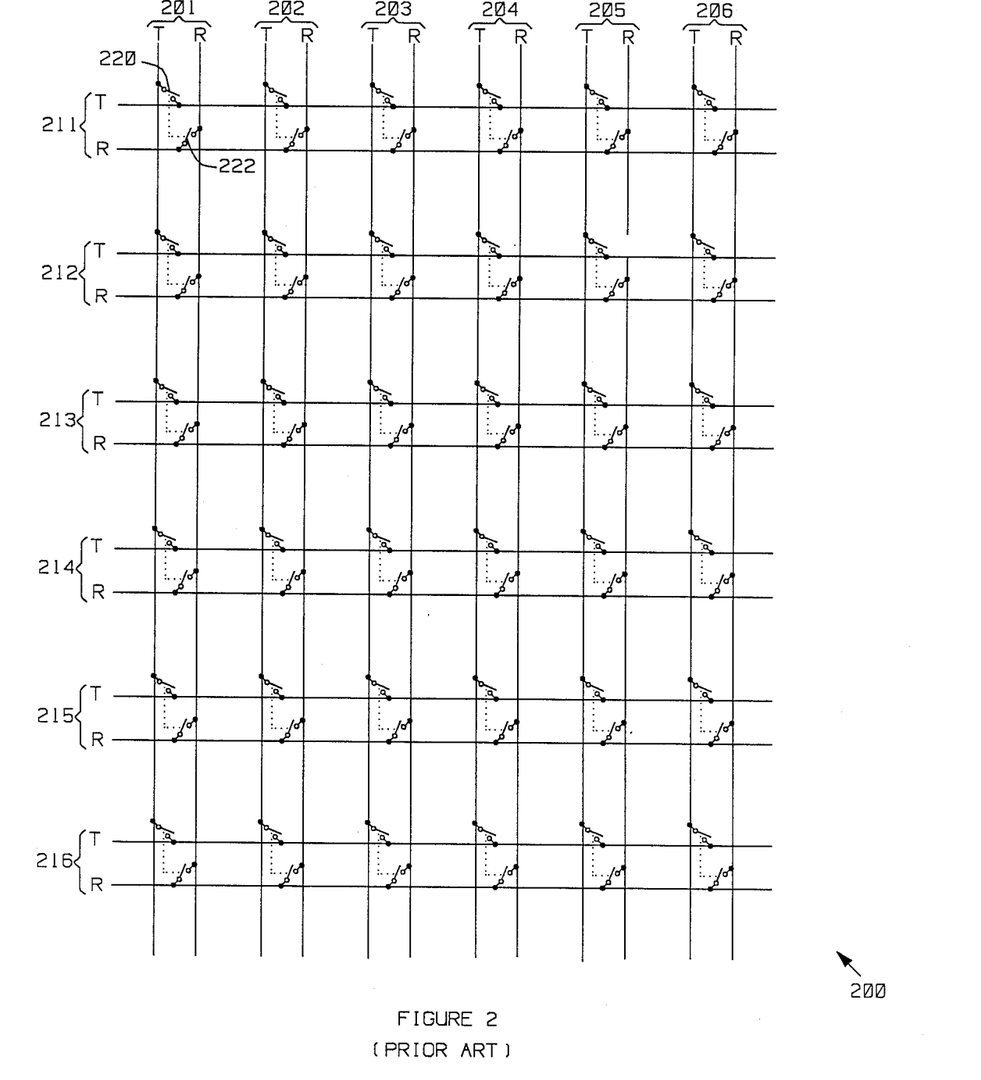
FIG. 2 illustrates a typical prior art 6×6 relay (switch) module used in telecommunications.

The magnitude of the problem facing a crosspoint switch defect detection system is illustrated by FIGS. 1 and 2 depicting a typical switch matrix and relay module used therein, respectively. Switch matrix 100 of FIG. 1 has 36 input lines 114 and 36 output lines 116. A representative relay module 110 has 6 input lines and 6 output lines. Other relay modules 106 and 108 are 2×2 and 3×3 matrices with two and three input and output lines respectively. Relay modules with n input lines and m output lines will be referred to as nxm relay modules. The lines joining the relay modules show the myriad possible paths which can be taken to get from one input line of the input line array 114 to one output line of the output line array 116. All the lines shown in FIG. 1 actually consist of two lines, the tip and ring conductors. They are represented by single lines for simplicity.

The relay modules typically are grouped into stages, such as the five stages shown in FIG. 1. A first stage is input stage 101, a fifth stage is output stage 105, a third stage is center stage 103, and 102 and 104 are second and fourth stages.

FIG. 2 is a schematic representation of a 6×6 relay module 200 for connecting any of six input lines 211–216 to any of six output lines 201–206. The conductors of each line are designated "T" and "R", respectively, representing the tip and ring conductors in a telephone system. Relay module 200 consists of thirty-six crosspoint switch pairs of which switches 220 and 222 form an exemplary pair. The dotted lines between pairs of switches are to indicate that the pairs of switches are under common control, typically through external signals from a computer which receives instructions specifying the desired connections. The connections to the computer have been omitted for clarity.

It can be seen that the detection and identification of defective crosspoint switches in a specific call path cannot depend on the length of the path taken as there are numerous paths of different lengths. The complexity of the system is also apparent from FIGS. 1 and 2 so the necessity of utilizing some property inherent to the switch matrix so as not to add to that complexity is clear. In fact, the cross-connect switch shown in FIG. 1 is relatively small compared to the cross-connect switches typically used in telecommunication applications. The complexity of the switch matrix also emphasizes the need of a detection and identification system which is capable of remote and automatic control. The proximity of individual crosspoints makes necessary a fine resolution which is also free of the possibly complicating effects introduced by attachments of the switch matrix to transmission long lines.

The present invention comprises a test system which is connected to a call path access system in a switch matrix. A test signal is transmitted and the crosspoint switches in the call path to be tested are operated in a predetermined order that depends on the point of connection to the call path. The response of properly operating crosspoint switches to the test signal produces known changes of characteristic properties of the switch matrix. Typical observable characteristic properties are capacitance, inductance, and resistance. The present invention utilizes capacitance. The change in the characteristic property in turn produces a change in a parameter of the test signal. The change in the test signal parameter is measured by a suitable detector. When a defective crosspoint switch is encountered, the change in the characteristic property of the switch matrix is not the same as that for a properly operating crosspoint switch. This results in a different change in the test signal parameter from that observed with a properly operating crosspoint switch. The defective crosspoint switch is thereby detected. By noting the position of the defective switch in the operation sequence, the defective crosspoint switch is identified and located.

Figure 3A:
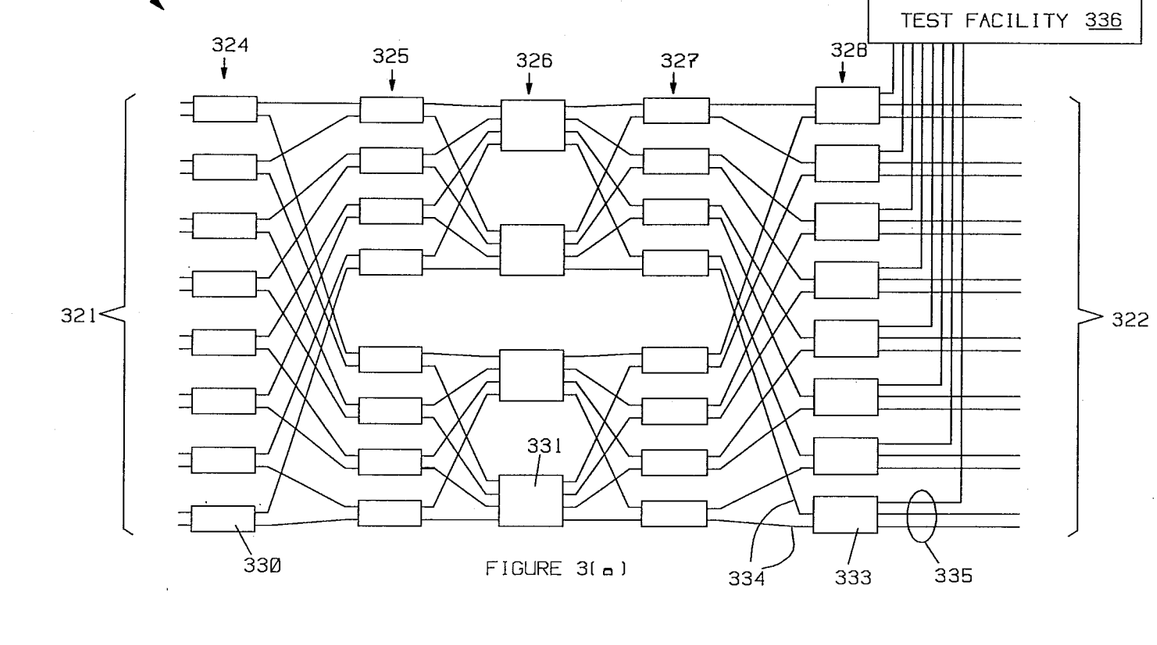
FIG. 3(a) illustrates the connection of a detection and location circuit according to the present invention connected to a test facility which is itself connected to a switch matrix.

The present invention for detecting and locating defective crosspoint switches requires a system for gaining access to the call paths. FIG. 3(a) is a schematic diagram of measuring circuit 370 according to the present invention connected to test facility 336 which provides access to call paths via an output stage 328 of an exemplary switch matrix 320. Switch matrix 320 connects input lines 321 to output lines 322. Stages 324, 325, and 327 are constructed from exemplary 2×2 relay modules, center stage 326 is constructed from 4×4 relay modules, and output stage 328 is constructed from relay modules 333 which have two input lines 334 and three output lines 335. One output from each relay module in output stage 328 is connected to a test facility 336. To simplify FIG. 3(a), the various connections between the relay modules are shown as single lines. Actually each such line represents two conductors, the tip and ring conductors.

Figure 3B:
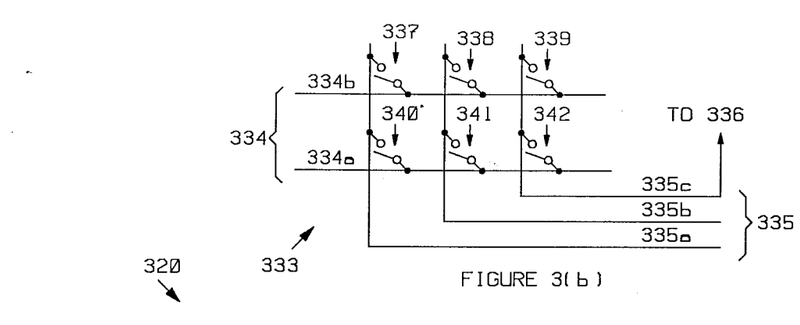
FIG. 3(b), is a schematic drawing of one of the output stage relay modules shown in FIG. 3(a).

A more detailed schematic of output stage relay module 333 is shown in FIG. 3(b). Each single line and each crosspoint switch actually represent tip and ring conductors and pairs of switches as depicted in FIG. 2. Each output stage relay module such as 333 consists of six crosspoint switches 337-342. Each crosspoint switch connects one of the output lines 335 to one of the input lines 334. For example, by closing crosspoint switch 340, input line 334a is connected to output line 335a. By closing crosspoint switch 342 connecting output line 335c to input line 334a, test facility 336 can also be connected to input line 334a. This forms a so-called "T" connection. If input line 334a were part of a call path connecting one of the switch matrix inputs 321 to a subscriber loop connected to one of the output lines 335a or 335b through switch matrix 320, test facility 336 and measurement circuit 370 would have access to the subscriber loop in question as well as the circuitry connected to the input line 321 in question.

With access to the call paths, the present invention provides a method and apparatus for testing the call path directly, utilizing properties inherent to the switch matrix itself.

There are two broad preferred embodiments of the present invention. The first comprises a phase shift detection system and the second a capacitance charge integration time system.

In a first broad embodiment of the present invention, the measured characteristic property of the switch matrix is capacitance and the test signal parameter is phase shift. Transmission of an AC test signal and sequential successful operation of crosspoint switches in the switch matrix increases load capacitance which in turn produces a phase shift in the test signal. A phase detector compares the phase-shifted signal to the original test signal and produces a DC voltage proportional to the phase shift. A properly operating crosspoint switch produces a known, reproducible phase shift. A defective crosspoint switch is indicated by a departure from this characteristic change in phase shift.

In a second broad embodiment of the present invention, the characteristic property is again capacitance. The test signal parameter is capacitance charge integration time. A DC current source is connected to the call path. As the crosspoint switches are operated sequentially, the DC test current charges the increased capacitance introduced by the sequentially added switches, and the charging time to a known voltage is measured. The charging time is then compared to the time required to charge the capacitance added by the successful operation of a crosspoint switch. A defective crosspoint switch is detected by a different capacitance charging time.

Following are detailed descriptions of circuits implementing each of the approaches just described.

THE COMMON MODE PHASE SHIFT CIRCUIT

A first embodiment of the phase shift detection system employs a common mode phase shift approach. An AC test signal is transmitted through a capacitor to either the tip or ring of the call path in the switch matrix. A phase detector is connected across a resistor in the circuit to measure the phase-shifted signal. A DC output voltage related to the phase shift is generated by the phase detector.

Figure 4:
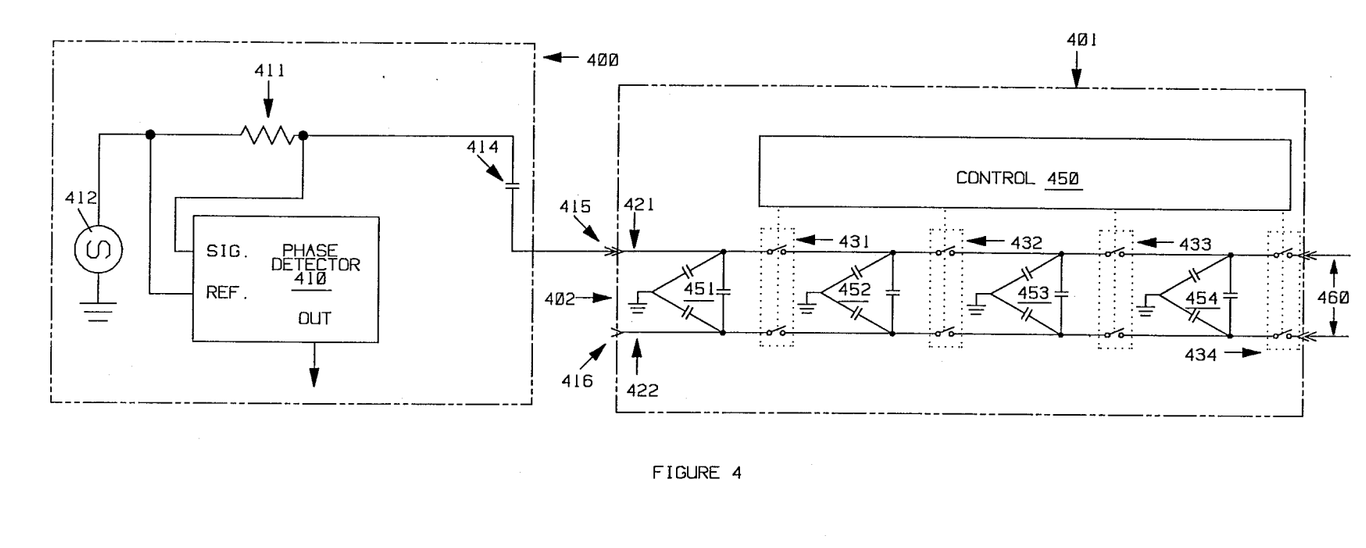
FIG. 4 is a schematic diagram of a common mode phase shift circuit according to the present invention connected to an exemplary call path in a switch matrix.

FIG. 4 shows a measuring circuit 400 and an exemplary call path 402 having four pairs of crosspoint switches 431-434 in a switch matrix 401. Measuring circuit 400 includes an AC signal source 412 in series with a resistor 411 and a capacitor 414. A phase detector 410 is connected across resistor 411 with a reference input from AC signal source 412 and a signal input through the parallel connection to call path 402. Measuring circuit 400 is connected to call path 402 in switch matrix 401 at a contact point 415.

Switch matrix 401 includes a pair of conductors 421 and 422 representing the tip and ring in call path 402. Conductor 421 serially connects halves of crosspoints 431-434. The total number of crosspoint switches in a call path depends on the particular switch matrix and the manner in which call paths are introduced into that matrix. Conductor 422 serially connects the other halves of crosspoints 431-434. The crosspoint switches are connected to, and under the control of, control computer 450 as represented by the dotted lines. Conductors 421 and 422 have distributed capacitance represented by capacitance delta networks 451-454. The last crosspoint switch 434 in the switch matrix is connected to a transmission long line 460.

AC signal source 412 transmits a high frequency test signal (for example 1 MHz) to the reference input of phase detector 410 and to conductor 421. The capacitance between conductor 421 and ground introduced by capacitor delta network 451 is measured. Because of this capacitance, the high frequency test signal is phase shifted with respect to the original source signal. The phase-shifted signal is compared with the original source signal (the reference signal) by phase detector 410 which produces a DC voltage output in response to the measured phase shift.

As each pair of crosspoint switches is operated sequentially, capacitance is added by capacitance delta circuits 451-454. The resulting change in phase shift produces a change in the DC output voltage from phase detector 410. If any crosspoint is not operational, the change in phase shift as measured by the DC output voltage will exhibit a departure from the expected value.

The sequential operation of crosspoints can proceed either to build up a call path (by successively closing the crosspoint switches beginning with crosspoint 431) or to take down a call path (by successively opening the crosspoint switches beginning from the last crosspoint). In both cases, the change in the DC output voltage from phase detector 410 will be different from that expected if there is a defective switch (either stuck open or stuck closed).

If transmission long line 460 is connected to call path 402, transmission long-line properties may cause the resulting load impedance on measuring circuit 400 to appear inductive. This complicates the interpretation of the changes in phase shift. Since there is a significant difference in load impedances between transmission long lines and switch matrices, the effects of transmission long lines can be minimized. This is achieved by capacitor 414 in measuring circuit 400. The proper choice of capacitor 414 sets the minimum impedance load seen by phase detector 410 and limits the dynamic range over which measuring circuit 400 must operate. The values of incremental capacitance inside switch matrix 402 range from about 10 pF to hundreds of pF while transmission long line 460 might have capacitance in the mF range. Capacitor 414 also prevents any extraneous DC voltages on transmission long line 460 from entering measuring circuit 400. Transmission lines often carry transient voltages. Capacitor 414 presents an impedance to such transient voltages, thus partially protecting measuring circuit 400 and also reducing the ratings requirements of necessary clamping circuits which are generally added to measuring circuits to prevent transient voltage-induced damage.

Measuring circuit 400 can also be connected to conductor 422 at contact point 416 to test crosspoints connected to conductor 422 in the same manner described above. Alternatively, two measuring circuits could be used, providing they operate nonsimultaneously or use different frequencies to avoid interference from the rather tightly coupled conductors.

PHASE BALANCED PHASE SHIFT CIRCUIT

A second embodiment of the phase shift detection system employs a balanced phase shift approach. Two AC test signals, which are 180 degrees out of phase, are transmitted simultaneously through capacitors to the tip and ring lines in the switch matrix. A phase detector is connected across resistors which are serially connected to each test signal source. The phase detector compares the phase shifts of fully operational switches to half-operational and non-operational switches. A DC output voltage is produced in response to the phase shift.

Figure 5:
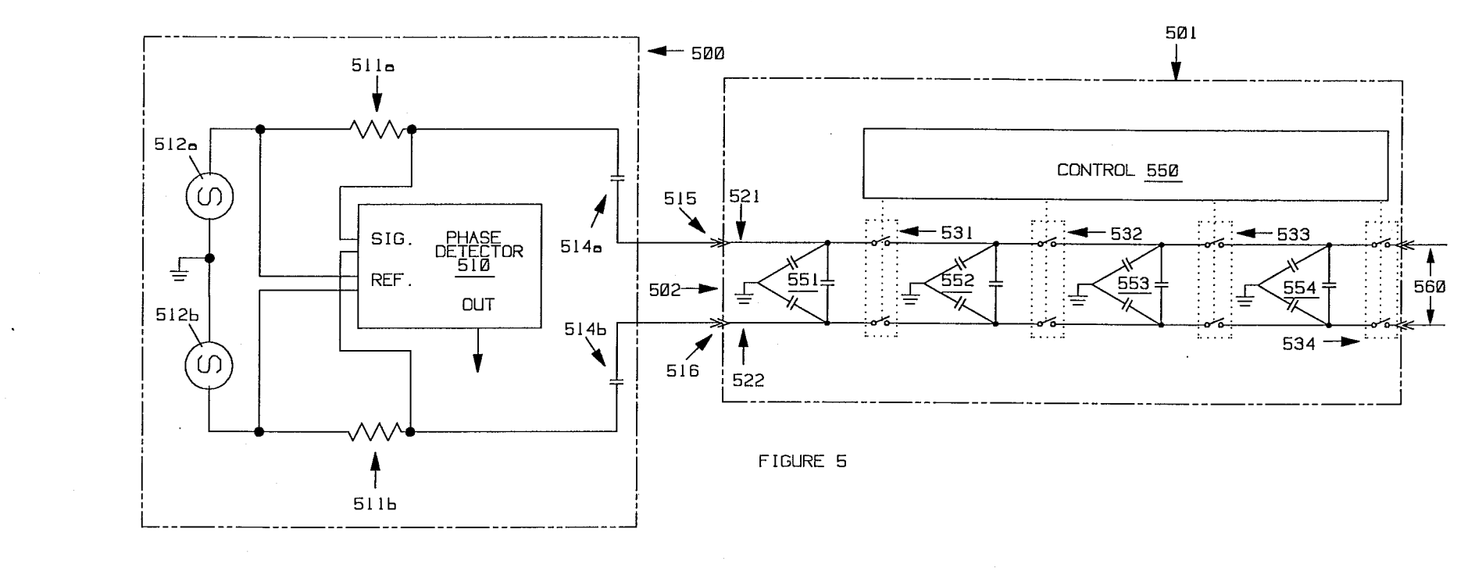
FIG. 5 is a schematic diagram of a balanced phase shift circuit according to the present invention connected to an exemplary call path in a switch matrix.

FIG. 5 shows a measuring circuit 500 connected to a circuit 502 which is electrically equivalent to a call path in a switch matrix 501. Measuring circuit 500 includes first and second AC test signal sources 512a and 512b in series with resistors 511a and 511b respectively and capacitors 514a and 514b respectively. A phase detector 510 is connected across resistor 511a and resistor 511b with reference signal inputs from test signal sources 512a and 512b. Measuring circuit 500 is connected at contact points 15 and 516 to call path 502 in switch matrix 501 through capacitors 514a and 514b.

Circuit 502 includes a series of crosspoint switches with each switch pair (e.g., 531) termed a "crosspoint" and one switch in the pair termed a "half-crosspoint." The crosspoint switches are connected to, and under the control of, control computer 550 as shown by the dotted lines. Conductors 521 and 522 have distributed capacitance represented by capacitance delta networks 551–554. The last crosspoint in switch matrix 501 is connected to a transmission long line 560.

Signal sources 512a and 512b simultaneously transmit high frequency signals which are 180 degrees out of phase to the reference inputs of phase detector 510 and to conductors 521 and 522. Crosspoint switches 531–534 are sequentially operated which results in capacitance from delta networks 551–554 being added to the circuit producing phase shifts in the test signal. Phase detector 510 compares the test signal to the reference signal from the signal source and outputs a DC voltage in response to the detected phase shift. "Operation of a half-crosspoint" means that one switch in the pair did not operate properly. Operation of a half-crosspoint typically produces about one-third the phase shift of an operation of a full crosspoint (i.e., both switches of the pair operating properly). This difference in phase shift between operation of a half-crosspoint and a full crosspoint is manifested in a change in the change in DC output voltage from phase detector 510, thereby indicating a defective crosspoint switch. Of course, if both half-crosspoint switches in a pair are defective, the change in DC output from phase detector 510 will be even more pronounced.

The high frequency signals from measuring circuit 500 introduced into switch matrix 501 may produce some interference with signals on other call paths in switch matrix 501. To minimize the effect, measuring circuit 500 may be energized for a very short measuring interval, e.g., a few milliseconds.

A typical implementation of the balanced phase shift embodiment of the present invention employs an XTL oscillator as AC signal source, an amplifier, and two low impedance output drives. The resistors 511a and 511b are 115 ohms with taps to accommodate diodes for protection from transients. Capacitors 514a and 514b are 1000 pF each.

The DC output of the phase detector is fed to a 10 bit A/D converter for further signal processing. The following table shows how the DC output voltage changes for good and half-crosspoint switches. The Delta reading is the difference in DC output with the crosspoint open and closed.

| Approximate length of conductor attached to crosspoint (ft.) | Good crosspoint Delta reading | Half crosspoint Delta reading |
|---|---|---|
| 0 | 46 | 13 |
| 10 | 100 | 25 |
| 600 | 97 | 13 |
| 7800 | 90 | −8 |
| 8400 | 90 | −9 |

It can be seen that the difference in reading between good and defective crosspoints (i.e., half-crosspoints) is large and sufficiently independent of call path length to allow detection and location of a defective crosspoint switch.

THE COMMON MODE INTEGRATION CIRCUIT

A first embodiment of the capacitance charge integration time system employs a common mode integrating approach. A DC source is connected through a capacitor shunt to either the tip or ring conductor of the call path under test in the switch matrix. Control signals operate a transistor, an amplifier, an OR gate, and a time interval counter to record capacitance charging time as the crosspoint switches are operated sequentially.

Figure 6:
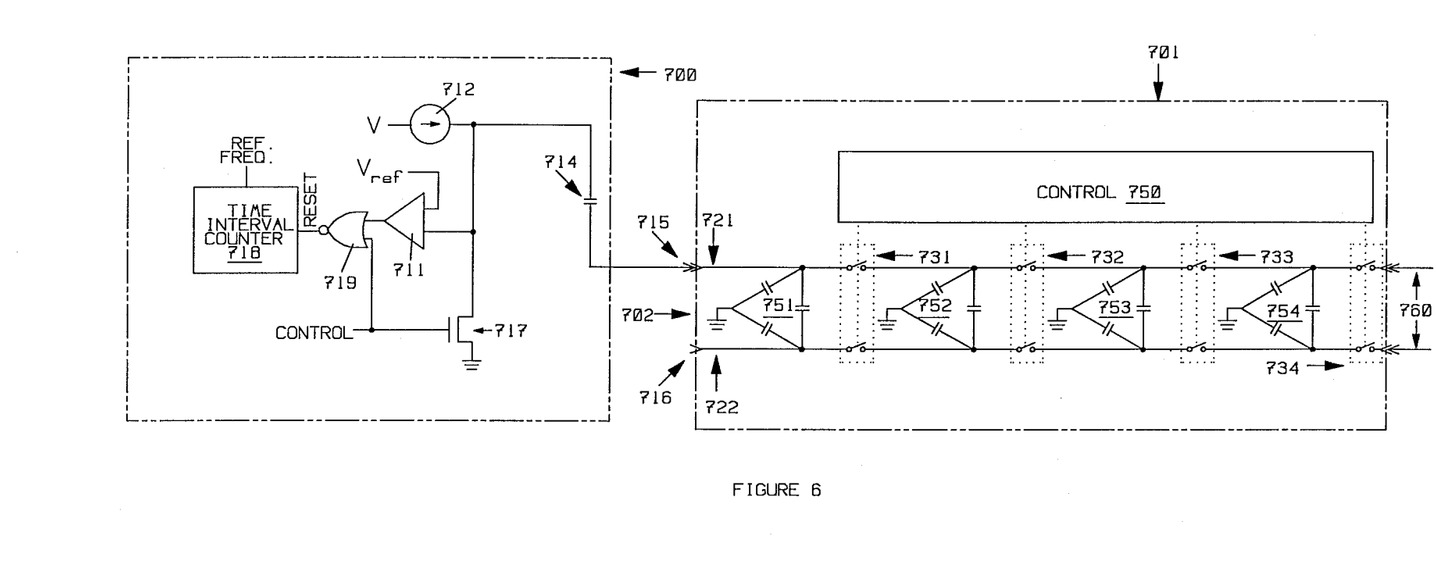
FIG. 6 is a schematic diagram of a common mode integration time circuit according to the present invention connected an exemplary call path in a switch matrix.

Referring to FIG. 6, measuring circuit 700 includes a DC current source 712 connected to an amplifier 711 with a DC reference voltage, a control transistor 717, OR gate 719, and time interval counter 718 with a reference frequency input and reset switch. This array is connected, through a capacitor 714, to one conductor 721 of a call path 702 in a switch matrix 701 at contact point 715.

Exemplary call path 702 includes crosspoint switches 731–734 which are connected by conductors 721 and 722 and has distributed capacitance represented by delta networks 751–754. The crosspoint switches are connected to, and under the control of, control computer 750 as represented by the dotted lines. Conductors 721 and 722 are connected to transmission long line 760.

To detect and locate a defective crosspoint, a control signal turns off transistor 717 and activates time interval counter 718 through OR gate 719. Time interval counter 718 measures time by counting cycles of a reference frequency. Current from current source 712 then begins to charge delta network capacitors 751. When the voltage produced by current source 712 over capacitor network 751 reaches the DC reference voltage inputted to amplifier 711, amplifier 711 outputs to gate 719 causing time interval counter 718 to stop, output the capacitor charging time, and reset itself.

By sequentially operating crosspoint switches 731–734 in call path 702, the time required to charge each capacitor delta network associated with each successive crosspoint can be compared to the previous value. If any crosspoint does not operate properly, the capacitance charging time will be different from that observed for good crosspoint switches and the defective crosspoint thereby detected and identified.

Typical values of charging current from current source 712 range from 1–10 mircoamperes. Any DC leakage in shunt with the measured capacitance must be small compared to the charging current. Within switch matrix 701, DC leakages are expected to be small. However, for long transmission long lines 760, shunt leakages may be so large that the voltage to which capacitors 751–754 Will be charged is less than the threshold voltage for resetting counter 718. In this case, counter 718 preferably includes an automatic reset which occurs if the count therein exceeds a predetermined value. Alternatively, capacitor 714 may be used to provide this reset function, since this capacitor will be eventually charged to the reference voltage even if the transmission long lines are shorted. It should be noted that a large charging time for the final switch is sufficient to determine that the switch was operative. Capacitor 714 also filters out DC voltages on conductor 721 and reduces the effects of transient currents in switch matrix 701.

THE BALANCED INTEGRATION CIRCUIT

A second embodiment of the capacitance charge integration time system employs a balanced integration approach. A DC source charges the switch matrix capacitance while maintaining a potential difference between the conductors of the call path. The capacitance charging time is measured in the same way and comparisons are made between good crosspoint switches and half- and non-operable crosspoint switches.

Figure 7:
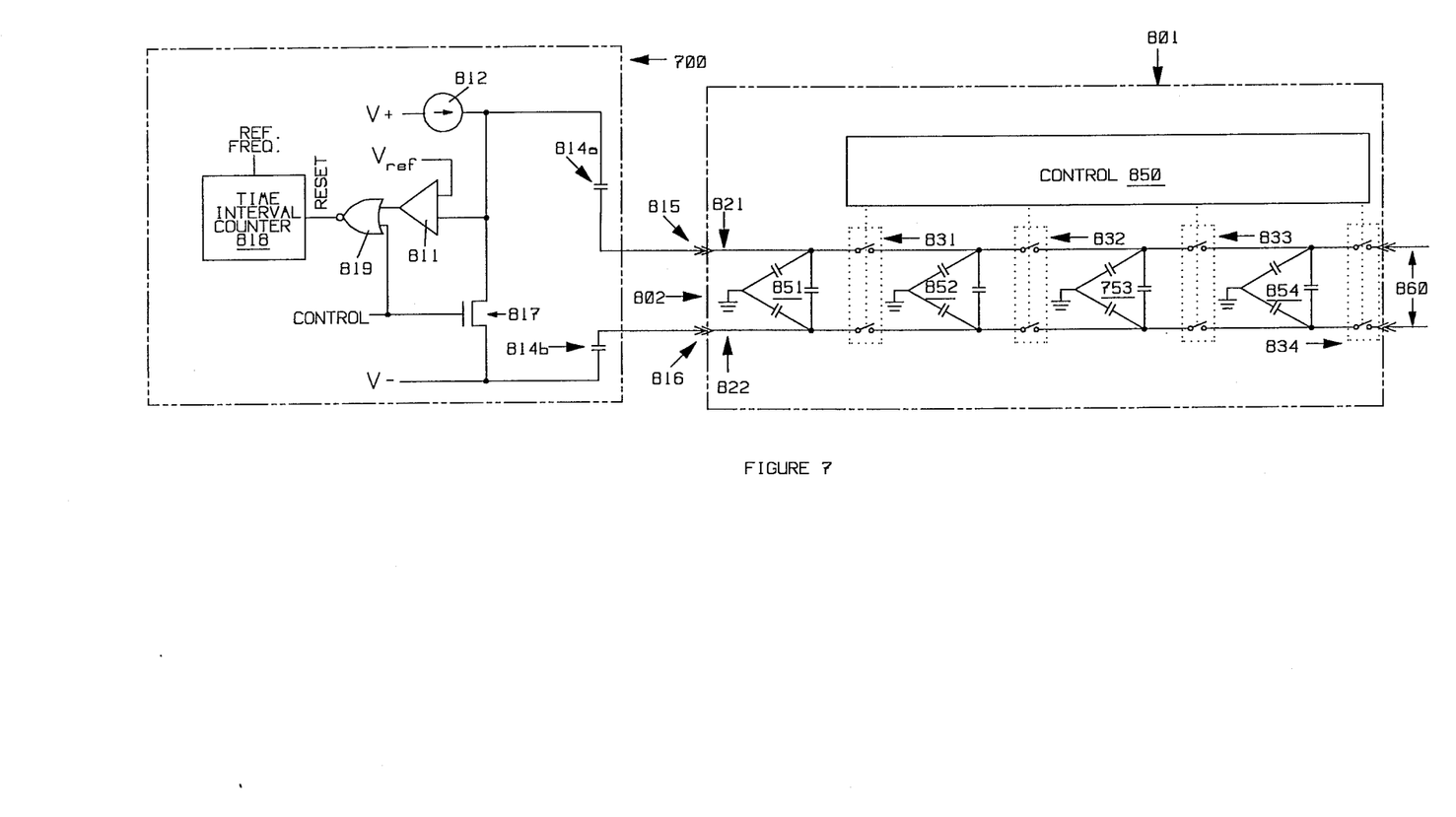
FIG. 7 is a schematic diagram of a balanced integration time circuit according to the present invention connected to an exemplary call path in a switch matrix.

FIG. 7 shows a measuring circuit 800 which includes a DC current source 812 connected to an amplifier 811 with a DC reference voltage, a control transistor 817, OR gate 819, and time interval counter 818 with a reference frequency input and reset switch. This array is connected, through capacitors 814a and 814b, to a call path 802 inside switch matrix 801 at contact points 815 and 816 and is not grounded. Capacitors 814a and 814b are coupled with capacitance twice the value of capacitor 714 shown in FIG. 6.

Call path 802 includes a series of crosspoints with each switch pair termed a "crosspoint" and one switch termed a "half-crosspoint." The crosspoints are connected to, and under the control of, a control computer 850 as shown by the dotted lines. The last crosspoint 834 is connected to a transmission long line 860.

To detect and locate a defective crosspoint, a control signal turns off transistor 817 and activates time interval counter 818 through OR gate 819. Current source 812 then begins to charge delta network capacitors 851. When the voltage produced by current source 812 reaches the DC reference voltage inputted to amplifier 811, amplifier 811 outputs to OR gate 819 causing time interval counter 818 to stop, output the capacitor charging time, and reset itself. The potential difference across conductors 821 and 822 is maintained by transistor 817.

"Operation of a half-crosspoint" means that one switch of a crosspoint pair did not operate properly. Operation of a half-crosspoint typically results in a charging time approximately one-third that of a full crosspoint (i.e., both switches of the pair operating properly). This difference in charging time between operation of a half-crosspoint and a full crosspoint can be seen in the output of time interval counter 818, thereby identifying a defective crosspoint switch.

Measuring circuit 800 may be connected to a specific crosspoint which may be reached by different paths, so the interpretation of the output of time interval counter 818 must be independent of the chosen path. Thus measuring circuit 800 must be linear over the range of absolute capacitance found within call path 802. A repeatable signal from each full crosspoint is required so that the smaller signal produced by a half-crosspoint is recognizable.

An advantage of the capacitance charge time integration approach is that it does not require high frequency measuring signals so no high frequency disturbance is injected into switch matrix 801.

Finally, the described embodiments of the present invention require sufficient capacitance differences to be detectable between successive crosspoint switches. Generally there will be such capacitance differences and no modification of the switch matrix to be tested is necessary. If, for some reason, the capacitance differences are not sufficient, capacitance may be added to each switch to allow the detection of capacitance changes.

The above description of the present invention has been made to a method and apparatus for detecting and locating defective crosspoint switches in a switch matrix. It will be apparent to those skilled in the art that the present invention is applicable to the detection of faulty switches in any path containing a series of switches.

The above description utilizes sequential operation of the switches with the measurement circuit connected to one end of the call path. It will be apparent to those skilled in the art that other connection schemes may be used. For example, the measurement circuit may be connected to the call path by making a "T" connection at a switch module within the call path. A test path connection scheme utilizing this approach is described in a co-pending patent, U.S. Ser. No.: 183,699. In this case, the switch points would be actuated in an order which adds capacitance to the portion of the call path connected to the test circuit. Alternatively, the switch points could be actuated in a manner which removes capacitance from the portion of the call path in question.

Although the above described embodiments of the present invention measure the change in capacitance by measuring either a phase shift or the time needed to charge the capacitance in question, it will be apparent to those skilled in the art that other means for measuring capacitance may also be employed in the present invention. For example, the change in resonant frequency of a circuit which includes the call path in question could be measured before and after a switch point is closed.

Similarly, the above described embodiments which utilize capacitor charging could also be used in a mode in which the capacitance being measured is first charged and the time needed to discharge the capacitance in question is measured.

Accordingly, there has been described herein a novel means for detecting, identifying, and locating defective crosspoint switches. Various modifications to the present invention will become apparent to those skilled in the art from the foregoing description and accompanying drawings. Accordingly, the present invention is to be limited solely by the scope of the following claims.

What is claimed is:

1. A method for detecting and locating defective switches in a call path, said call path comprising an ordered sequence of conductive segments coupled by switches, each conducting segment comprising first and second conductors and each switch comprising first and second switch points, wherein, when each said switch is in a closed state, said first switch points connect adjacent said first conductors in adjacent said segments to form a first conducting path and said second switch points connect adjacent said second conductors in adjacent said segments to form a second conducting path, said conducting segments being electrically isolated when each of said switches is in an open state, said method comprising making a connection to a first measurement point in said first conducting path and measuring the change in capacitance between said first measurement point and a second measurement point comprising either a point on said second conducting path or ground when a said switch is operated between an open and closed state.

2. The method of claim 1 wherein said step of measuring the change in capacitance comprises
    coupling an AC test signal between said first and second measurement points; and
    measuring a phase shift in said AC test signal when a said switch in said first conducting path is operated between said open and closed states.

3. The method of claim 1 wherein said second measurement point comprises a point in said second conducting path and wherein said step of measuring the change in capacitance comprises:
    coupling first and second AC test signals between said first and second measurement points, said AC test signals being 180 degrees out of phase; and
    measuring the phase shifts in said AC test signals when said switch is operated between said open and closed state.

4. The method of claim 1 wherein said step of measuring the change in capacitance comprises
    coupling a DC test signal between said first and second measurement points; and
    measuring the time needed for the difference in potential between said measurement points to reach a predetermined value when a said switch is operated between said open and closed state.

5. An apparatus for detecting and locating defective switches in a call path, said call path comprising an ordered sequence of conductive segments coupled by switches, each conducting segment comprising first and second conductors and each switch comprising first and second switch points, wherein, when each said switch is in a closed state, said first switch points connect adjacent said first conductors in adjacent said segments to form a first conducting path and said second switch points connect adjacent said second conductors in adjacent said segments to form a second conducting path, said conducting segments being electrically isolated when each of said switches is in an open state, said apparatus comprising means for making a connection to a first measurement point in said first conducting path and means for measuring a change in capacitance between said first measurement point and a second measurement point comprising either a point in said second conducting path or ground when a said switch is operated between said open and closed state.

6. The apparatus of claim 5 wherein said means for measuring said change in capacitance comprises:
    means for generating and coupling an AC test signal between said first and second measurement points;
    means for operating said switches in said predetermined order; and
    means for measuring a phase shift in said AC test signal when said switch is so operated.

7. The apparatus of claim 6 wherein said phase shift measuring means comprises
    a phase difference detector; and
    a resistor connected between said generating means and said first measurement point, said phase difference detector being connected there-across;

8. The apparatus of claim 5 wherein said phase shift measuring means comprises
    a phase difference detector for measuring the average phase difference across two different resistors;
    first and second AC test signal sources;
    a first resistor connected in series with a point on said first conducting path; and
    a second resistor connected in series with a point on said second conducting path wherein
    said first source is connected between said first resistor and ground,
    said second is connected between said second resistor and ground, and
    said phase difference detector is connected across said first and second resistors.

9. The apparatus of claim 5 wherein said measuring means comprises
    means for generating and coupling a DC test signal between said first and second measurement points;
    means for measuring the time needed for the voltage difference between said first and second measurement points to reach a predetermined value.

10. The apparatus of claim 5 wherein said measuring means comprises
    means for coupling a test potential between said first and second measurement points;
    means for connecting said first and second measurement points together in response to a first control signal value and for electrically isolating said first and second measurement points in response to a second control signal value;
    means for measuring the time needed for the potential difference between said first and second measurement points to reach a predetermined value when said first control signal value is replaced by said second control signal value.

11. A method for detecting and locating defective switches in a call path, said call path comprising an ordered sequence of conductive segments coupled by switches, wherein, when each said switch is in a closed state, said switches connect adjacent said conductive segments to form a conducting path, said conducting segments being electrically isolated when each of said switches is in an open state, said method comprising making a connection to a measurement point in said conducting path and measuring the change in capacitance between said measurement point and ground when a said switch is operated between an open and closed state.

12. An apparatus for detecting and locating defective switches in a call path, said call path comprising an ordered sequence of conductive segments coupled by switches, wherein, when each said switch is in a closed state, said switches connect adjacent said conductive segments to form a conducting path, said conducting segments being electrically isolated when each of said switches is in an open state, said apparatus comprising means for measuring a change in capacitance between a measurement point in said conductive path and ground when a said switch is operated between said open and closed state.

* * * * *